United States Patent
Saghi et al.

(10) Patent No.: US 9,424,219 B2
(45) Date of Patent: Aug. 23, 2016

(54) DIRECT ROUTING BETWEEN ADDRESS SPACES THROUGH A NONTRANSPARENT PERIPHERAL COMPONENT INTERCONNECT EXPRESS BRIDGE

(71) Applicant: LSI CORPORATION, San Jose, CA (US)

(72) Inventors: Eugene Saghi, Colorado Springs, CO (US); Richard Solomon, Colorado Springs, CO (US); Timothy E. Hoglund, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 239 days.

(21) Appl. No.: 13/804,839

(22) Filed: Mar. 14, 2013

(65) Prior Publication Data
US 2014/0281106 A1    Sep. 18, 2014

Related U.S. Application Data

(60) Provisional application No. 61/777,896, filed on Mar. 12, 2013.

(51) Int. Cl.
*G06F 13/40* (2006.01)
*G06F 3/06* (2006.01)
*G06F 13/38* (2006.01)

(52) U.S. Cl.
CPC .......... *G06F 13/404* (2013.01); *G06F 3/0664* (2013.01); *G06F 13/385* (2013.01); *G06F 13/4036* (2013.01)

(58) Field of Classification Search
CPC . G06F 3/0662; G06F 3/0664; G06F 9/45533; G06F 3/45558; G06F 2009/45579; G06F 2009/45583; G06F 12/10; G06F 12/1027; G06F 12/1036; G06F 12/1063; G06F 12/1081; G06F 13/38; G06F 13/40; G06F 13/4004; G06F 13/4022; G06F 13/4027; G06F 13/404; G06F 13/4045; G06F 13/1342; G06F 13/4265
See application file for complete search history.

(56) References Cited

U.S. PATENT DOCUMENTS 7,062,594 B1 *  6/2006  Sardella et al. ............... 710/314
7,631,128 B1 * 12/2009  Sgrosso et al. ................ 710/105

(Continued)

FOREIGN PATENT DOCUMENTS

EP         0801352         11/2006

OTHER PUBLICATIONS

"Multi-Host System and Intelligent I/O Design with PCI Express". 2004. PLX Technology, Inc.*

(Continued)

*Primary Examiner* — Thomas J Cleary

(57) ABSTRACT

A system includes a PCIe controller coupled to a device through a nontransparent PCIe bridge. The controller is operable to direct I/O operations to the device on behalf of a host system. The system also includes a PCIe driver operable within the host system to generate I/O request descriptors that specify movement of data from the PCIe controller to the host system as well as from the host system to the PCIe controller. The PCIe controller processes the I/O request descriptors and determines which device is involved in the specified movement of data. The PCIe controller generates I/O commands that contain routing information for the device (e.g., memory addresses and steering information) to route the data between the memory address of the host system and the memory address of the device, bypassing a memory of the PCIe controller.

12 Claims, 5 Drawing Sheets

(56) References Cited

U.S. PATENT DOCUMENTS

| | | |
|---|---|---|
| 7,783,818 B1 * | 8/2010 | Sardella et al. ............... 710/313 |
| 2008/0301350 A1 * | 12/2008 | Larson et al. ................ 710/313 |
| 2009/0063894 A1 * | 3/2009 | Billau et al. .................... 714/5 |
| 2009/0077297 A1 * | 3/2009 | Zhao et al. .................... 710/314 |
| 2009/0113430 A1 * | 4/2009 | Riley ............................. 718/101 |
| 2011/0238909 A1 * | 9/2011 | Kumar et al. ................. 711/114 |
| 2011/0302349 A1 * | 12/2011 | Griggs ........................... 710/311 |
| 2012/0166699 A1 * | 6/2012 | Kumar et al. ................. 710/306 |
| 2012/0297135 A1 * | 11/2012 | Mathew et al. ............... 711/114 |
| 2013/0339955 A1 * | 12/2013 | Prawer et al. .................... 718/1 |
| 2014/0075079 A1 * | 3/2014 | Tsai .............................. 710/308 |

OTHER PUBLICATIONS

Jack Regula, "Using Non-transparent Bridging in PCI Express Systems," Jun. 1, 2004, PLX Technology, Inc.

PCI-SIG Engineering Change Notice to IBM, Intel Corporation, AMD, HP "TLP Processing Hints, PCI Express Base Specification version 2.0, Atomic Operations ECN," Sep. 11, 2008.

Mahesh Wagh, "PCIe®3.0/2.1Protocol Update," Intel Corporation Copyright © 2011, PCI-SIG, All Rights Reserved.

\* cited by examiner

DIRECT ROUTING BETWEEN ADDRESS SPACES THROUGH A NONTRANSPARENT PERIPHERAL COMPONENT INTERCONNECT EXPRESS BRIDGE

CROSS REFERENCE TO RELATED APPLICATIONS

This patent application claims priority to, and thus the benefit of an earlier filing date from U.S. Provisional Patent Application 61/777,896 (filed Mar. 12, 2013), the entire contents of which are hereby incorporated by reference.

FIELD OF THE INVENTION

The invention generally relates to the field of Peripheral Component Interconnect Express (PCIe) controllers and more particularly to the direct mapping between address spaces through a nontransparent PCIe bridge.

BACKGROUND

When a non-transparent PCIe bridge is used to connect a device to a host system as well as to resources internal to the PCIe bridge, direct transfer of data from the PCIe memory space of the host system to the PCIe memory space of the device, and vice-versa, is generally not possible. While the PCIe bridge has an internal address space to which some transactions may be directed, the PCIe protocol does not provide a mechanism for direct mapping of one PCIe memory address space to another. Thus, the PCIe bridge cannot distinguish a transaction directed to its internal address space from one directed to the host system's PCIe memory space. Furthermore, in a PCIe architecture that employs virtualization, such as that found in a Single Root Input/Output Virtualization (SR-I/OV) PCIe controller, the host system may support I/O virtualization even though the device does not or does not support the same number of virtual functions that the PCIe controller publishes to the host system. Nothing in the PCIe protocol allows the device to convey a host virtual function identifier directly to the host system during I/O operations in a PCIe bridge.

SUMMARY

Systems and methods presented herein provide for mapping data transfers and virtual functions between memory addresses in a PCIe architecture that includes a nontransparent PCIe bridge. In one embodiment, the system includes a PCIe controller coupled to a device (e.g., a storage device such as a solid state drive or a computer disk drive) through a nontransparent PCIe bridge. The controller is operable to direct I/O operations to the device on behalf of a host system. The system also includes one or more PCIe drivers operable within the host system to generate I/O request descriptors that specify movement of data from the PCIe controller to the host system as well as from the host system to the PCIe controller. The PCIe controller processes the I/O request descriptors and determines which device or devices are involved in the specified movement of data. The PCIe controller is further operable to generate I/O commands that contain routing information for the device, such as device memory addresses, host system memory addresses, and steering information, to route the data between a memory address of the host system and a memory address of the device, while bypassing a memory of the PCIe controller.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
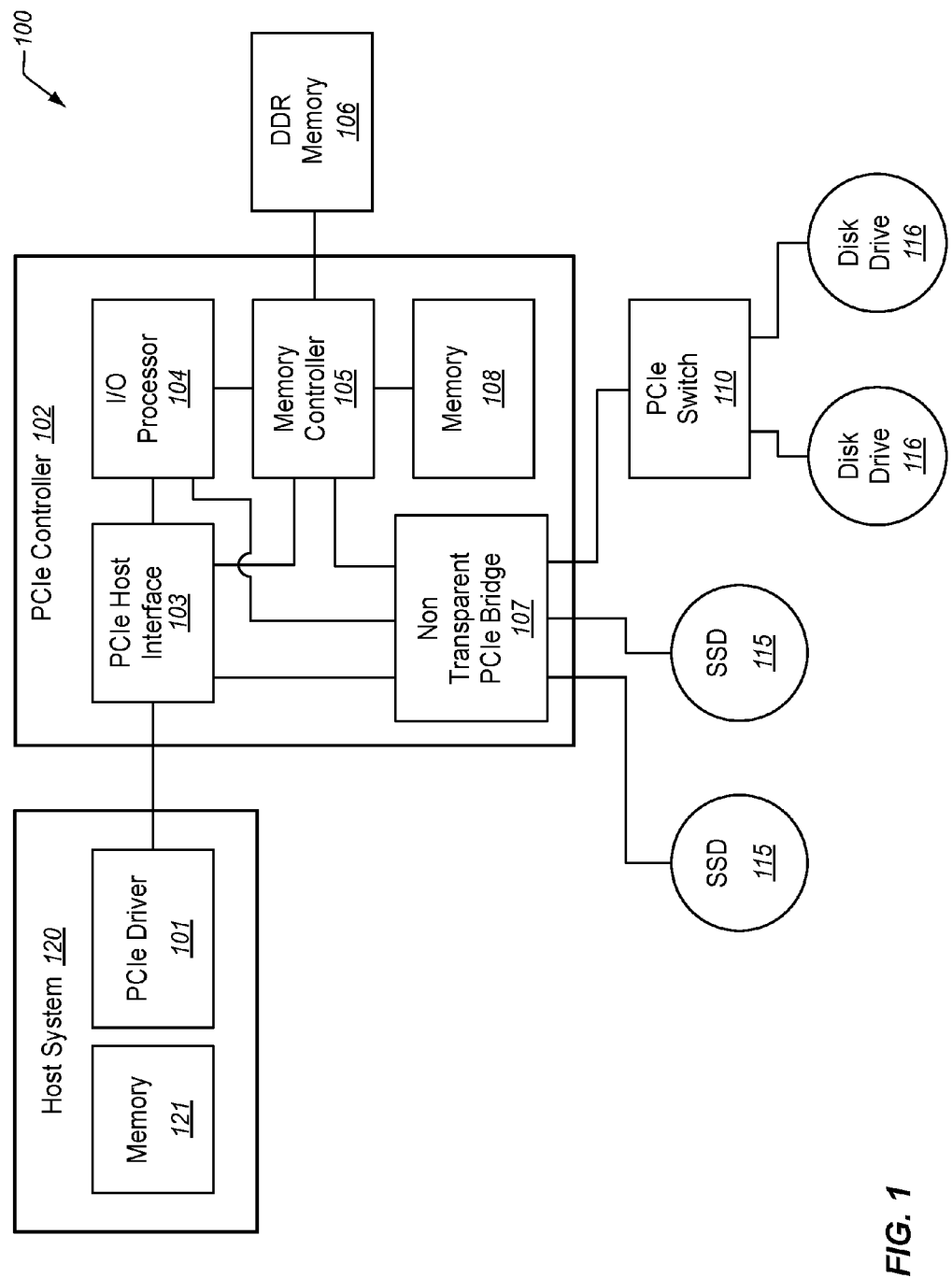
FIG. 1 is a block diagram of an exemplary PCIe architecture.

FIG. 1 is a block diagram of an exemplary PCIe architecture 100. In this embodiment, a PCIe controller 102 includes a PCIe host interface 103 for communicating with a host system 120 through a PCIe driver 101 resident in the host system 120. The PCIe controller 102 performs I/O operations on behalf of the host system 120 with a plurality of devices coupled thereto. For example, the PCIe controller 102 may be coupled to a plurality of storage devices such as Solid State Drives (SSDs) 115 and/or a plurality of computer disk drives 116 (e.g., through a PCIe switch 110). Through the PCIe controller 102, the host system 120 can read data from and write data to the various devices without direct knowledge about the devices.

The PCIe controller 102 includes an I/O processor 104 that prepares the I/O operations of the host system 120 for direction to the various devices. The PCIe controller 102 includes a nontransparent PCIe bridge 107 to provide an I/O interconnect between the PCIe controller 102 and the devices and to function as a gateway to the devices. The PCIe controller 102 isolates the devices from the host system 120 by masquerading as an endpoint to discovery functionality (e.g., of the host system 120 with the PCIe controller 102). The nontransparent PCIe bridge 107 acts as a root complex to the attached devices and also translates addresses of transactions passing through the bridge 107 (e.g., I/O operations on the SSDs 115 and the disk drives 116).

The PCIe controller 102, in this embodiment, also includes a Double Data Rate (DDR) Random Access Memory (RAM) 106 that is "visible" to the devices coupled to the PCIe controller 102. The DDR memory 106 allows the PCIe controller 102 to cache data from various transactions to the devices. For example, the PCIe controller 102 may temporarily store information pertaining to I/O operations between the devices and the host system 120.

The PCIe controller 102 also includes a memory 108 that is operable to store firmware for the controller 102. For example, the PCIe controller 102 may be a Single Root Input/Output Virtualization (SR-I/OV) PCIe controller that virtualizes hardware functionality of the controller 102 for various guest operating systems present on the host system 120. An SR-I/OV PCIe controller is operable to connect to devices employing the PCIe protocols regardless of whether the devices actually support I/O virtualization. The memory 108 may also be used to store transactions of the PCIe controller 102 (e.g., I/O operations between the controller 102 and the host system 120) as well as provide memory maps to/from various devices including the host system 120. The memory controller 105 is operable to control memory functionality of the local memory 108 and the DDR memory 106 including the control of the mapping.

In addition to providing the communication link between the host system 120 and the PCIe controller 102, the PCIe driver 101 is operable to generate I/O descriptors that are used by the PCIe controller 102 to route data between the memory 121 and a particular device. The I/O descriptors include routing information that is used by the PCIe controller 102 in the I/O commands for a device. The specified device in an I/O command may then generate a transaction layer packet (TLP) processing hint for the PCIe controller 102 throughout the information between the memory 121 of the host system 120 and a memory address of the device.

TLP processing hints are data transfer mechanisms within the PCIe protocol that allow data to be transferred from various memory locations within the PCIe controller 102. The I/O descriptors from the PCIe driver 101 allow the host system 120 to perform direct data transfers using the TLP processing hints between various memory locations of the memory 121 resident in the host system 120 and the memory locations of the devices coupled to the PCIe controller 102, bypassing any memory mapping that may be performed by the PCIe controller 102. The I/O descriptors may also allow the host system 120 to directly transfer data between memory locations of the memory 121 and various memory locations of the memory 108 and the DDR memory 106. The memory 121 is any memory operable within a host system that can be allocated space for PCIe functionality.

It should be noted that the invention is not limited to any number of devices coupled to the PCIe controller 102. For example, although two SSDs 115 are coupled to the PCIe controller 102 as well as two disk drives 116 through the PCIe switch 110, the PCIe controller 102 may be operable to interconnect more or less devices than the number of devices illustrated. Additionally, the invention is not limited merely to storage devices such as the SSDs 115 and the disk drives 116. It should also be noted that the PCIe switch 110 is an optional feature merely illustrated herein to present one possible PCIe architecture. Additional details regarding the operation of the PCIe architecture 100 are now shown and described with respect to the flowchart in FIG. 2.

Figure 2:
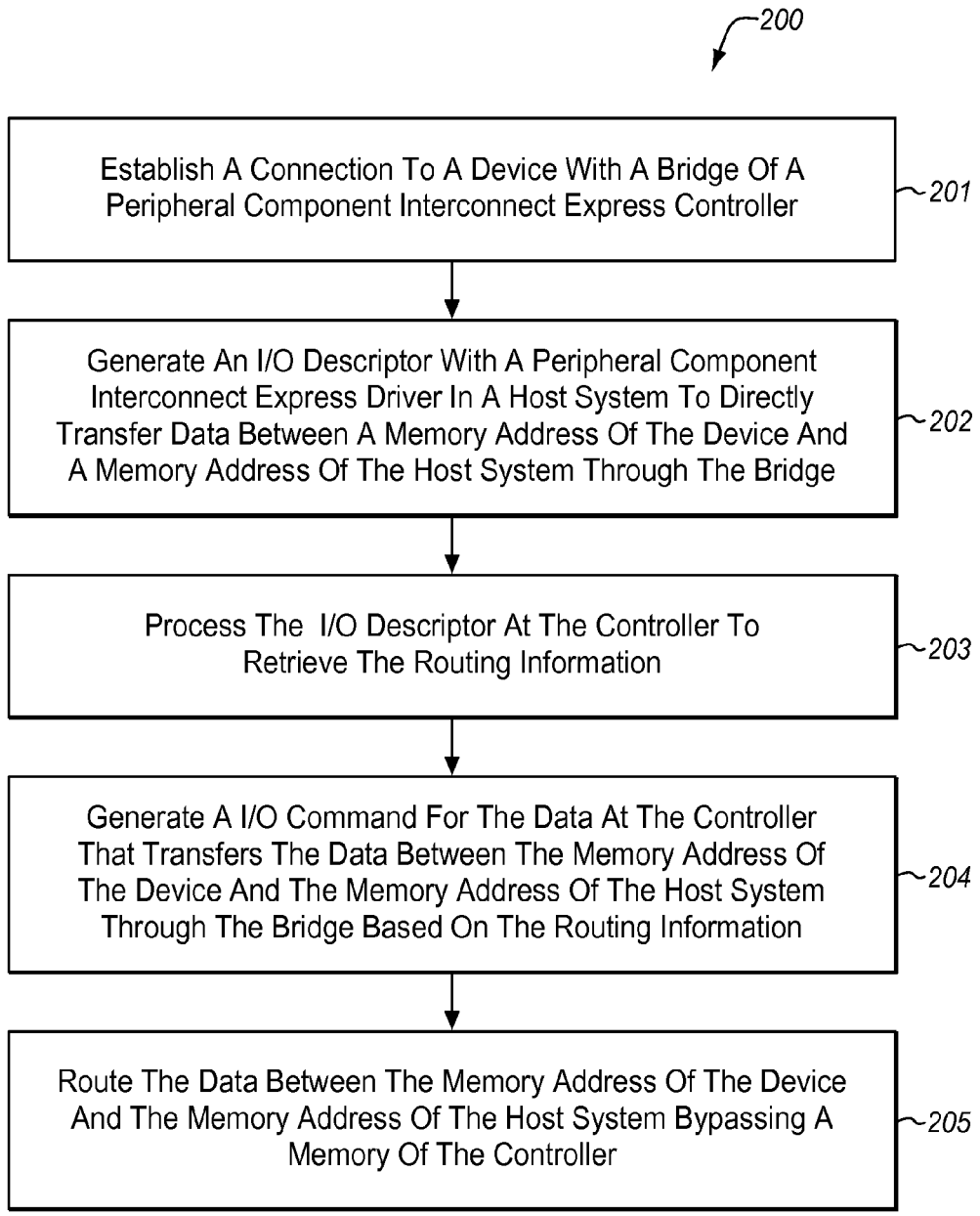
FIG. 2 is a flowchart of a process of the exemplary architecture of FIG. 1.

FIG. 2 is a flowchart 200 of a process operable within the PCIe architecture 100. More specifically, flowchart 200 illustrates a process in which the PCIe controller 102 may provide direct data transfers between memory locations of the host system 120 and various devices, including the PCIe controller 102 and the devices connected thereto. The process initiates when a connection is first established with the device via the nontransparent PCIe bridge 107 of the PCIe controller 102, in the process element 201. For example, once a link is established between the PCIe controller 102 and the SSDs 115/disk drives 116, I/O operations of the host system 120 may be performed on the SSDs 115/disk drives 116.

The host system 120 may request access to data from a memory location within one of the SSDs 115 and the disk drives 116. Accordingly, the host system 120 may direct the PCIe controller 102 to generate an I/O command for the data. The host system 120, through the PCIe driver 101, generates an I/O descriptor that includes routing information that is used by the PCIe controller 102 to transfer data between a memory address of one of the devices (SSDs 115/disk drives 116) through the PCIe bridge 107, in the process element 202.

The PCIe controller 102 processes the I/O descriptor to retrieve the routing information, in the process element 203. The PCIe controller 102 then generates an I/O command that includes the routing information and is operable to transfer the data between the memory address of the device and the memory address of the host system 120 through the PCIe bridge 107, in the process element 204. The PCIe controller 102 transfers the I/O command to the device such that the device can provide access to the requested data. That is, if the I/O command is a write request for data, then the PCIe controller 102 transfers the data from the specified memory address of the host system 120 directly to the specified memory address of the device while bypassing a memory of the PCIe controller 102, in the process element 205. Alternatively, if the I/O command is a read request, then the PCIe controller 102 transfers the data from the specified memory of the device directly to the specified memory address of the host system 120 while bypassing the memory of the PCIe controller 102, in the process element 205.

To further illustrate, the routing information is passed to the devices SSDs 115/disk drives 116 within the I/O commands issued by the PCIe controller 102 to the devices. The device(s) may then include the routing information in TLP processing hints generated by the device to masquerade as steering tags. When the PCIe controller 102 receives a packet of data from a device, the PCIe controller 102 determines whether a steering tag is present. If so, the PCIe controller 102 interprets the steering tag as routing information to determine whether the address in the packet is a local memory address or a memory address in the host system 120. When the steering tag is directed to local memory, the PCIe bridge 107 simply routes packets with local addresses to the local memory 108 of the PCIe controller 102 or the DDR memory 106 as normal. However, when the steering tag is directed to the memory 121 of the host system 120, the PCIe controller 102 routes the data (and any indication of a virtual function associated with the I/O command) to the PCIe host interface 103. The PCIe host interface 103 then builds and sends one or more packets to the host system 120. The packets contain the address forwarded by the PCIe bridge 107 as well as any requester ID that reflects virtual function information received from the PCIe bridge 107. Thus, the host system 120 is operable to transfer data between the device with any request while bypassing the memory 108 of the PCIe controller 102 by masquerading as though the data came directly from the PCIe controller 102 without the host system 120 having direct knowledge of the devices attached to the PCIe controller 102.

The use of TLP processing hints herein allows the nontransparent PCIe bridge 107 to make decisions regarding the routing of requests so as to bypass local memory 108 of the PCIe controller 102. Additionally, current TLP processing hints have a capability that allows for 16-bit steering tags by pre-pending a TLP prefix to a request. For example, present TLP prefix contain an additional 8 bits of steering tag. The TLP processing hints could be extended to use 16-bit steering tags by specifying a 16-bit field in the I/O descriptors and I/O commands. Devices would then generate requests with a TLP prefix. The PCIe controller 102 could then make even more complex routing decisions because a 16-bit steering tag would allow many more possibilities. Requests forwarded to the host system 120 from the PCIe controller 102 generally would not add a TLP prefix so as to keep the host system 120 from being aware that TLP processing hints are being used between the devices and the PCIe controller 102 in routing decisions.

Figure 3:
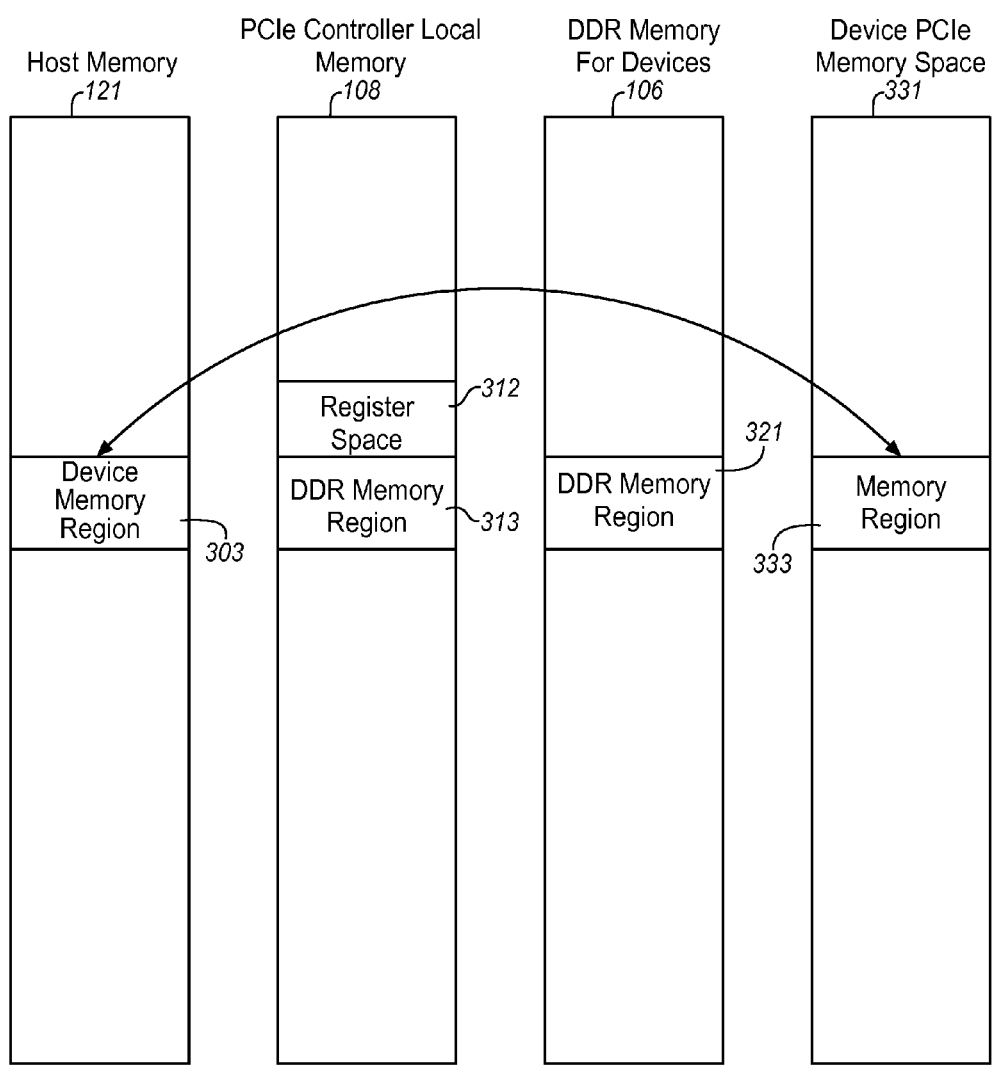
FIG. 3 is a block diagram of various memories within the exemplary PCIe architecture of FIG. 1.
Figure 4:
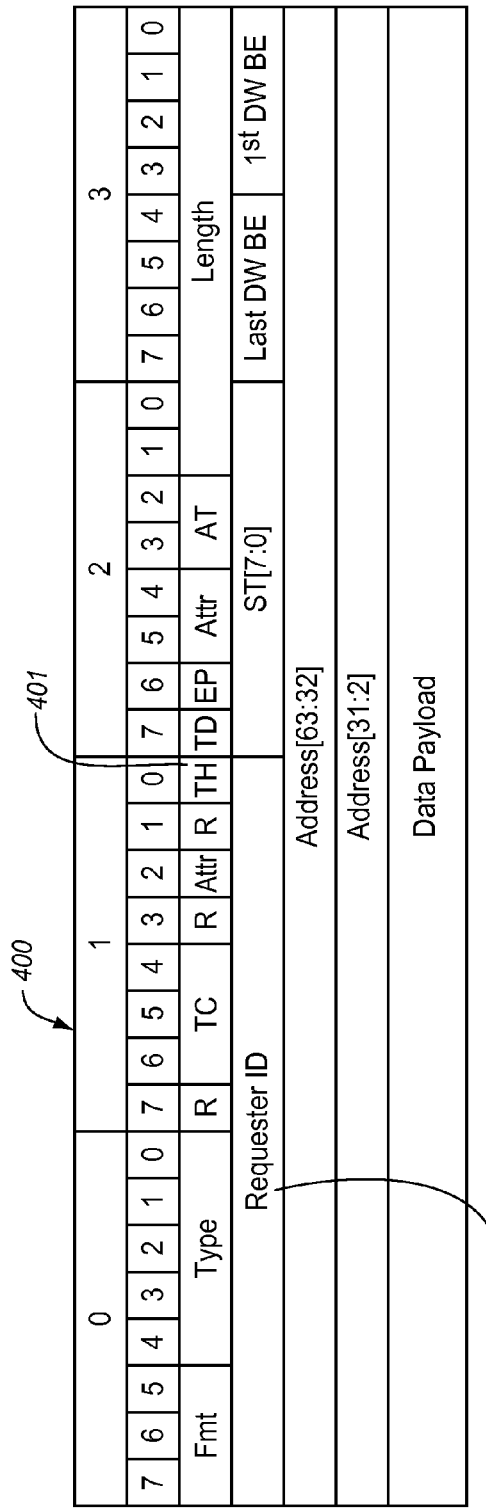
FIGS. 4 and 5 illustrate exemplary packet structures of Transaction Layer Packet (TLP) processing hints that may be operable within the PCIe architecture of FIG. 1.
Figure 5:
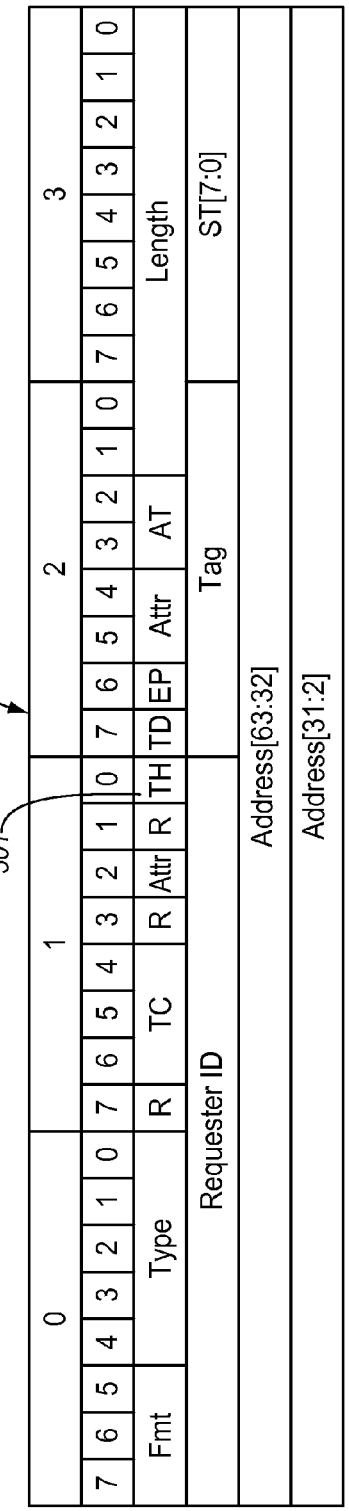

FIG. 3 is a block diagram of various memories within the exemplary PCIe architecture 100 to even further illustrate this process. More specifically, PCIe memory spaces of the host system 120 (i.e., memory 121), the PCIe controller 102 (i.e., local memory 108), the DDR 106 for the attached devices, and an exemplary device (i.e., the device PCIe memory space 331 such as that of an SSD 115/disk drive 116) illustrate the direct data transfer techniques described herein. FIGS. 4 and 5 respectively illustrate TLP processing hints used to write and read between the PCIe memory 121 of the host system 120 and the device's memory space 331.

The PCIe controller 102 may allocate a memory region 333 in a device's PCIe memory (the PCIe memory space 331). Previously, this could have created a conflict when the host system 120 chose to send the device a command using an address falling within a similar/corresponding device memory 303, as the memory regions 303 and 333 were created by the PCIe controller 102 without knowledge of the host system 120, as were the memory regions 313 and 321 for the DDR memory 106. And, the PCIe controller 102 cannot distinguish between the two memory regions 303 and 333. Accordingly, the PCIe controller 102 would perform an address translation via the register 312 allocated in the PCIe controller 102's local memory 108.

The TLP processing hints optimize processing of data transfer requests that target the memory spaces of the memory 121 of the host system 120 and the memory spaces of the memory 331 of the desired device. The TLP processing hint modifies memory write request packets as shown in the write TLP processing hint packet 400 of FIG. 4. Steering tag values in the TLP processing hints identify system specific processing resources that the host system 120 targets. For example, a TH bit 401 that is set indicates that a packet contains a TLP processing hint. And, the TH bit 401 is set if a steering tag ST[7:0] is present. If the TH bit is not set, then no TLP processing hint is present and the steering tag field ST is relegated to being an arbitrary tag assigned by a requester. The receiver of the request does nothing with the received tag and a tag field of a typical memory write request would then be presented to the device. A memory read request is similar, but the steering tag occupies a different location in the packet structure as illustrated in the read TLP processing hint packet 500 of FIG. 5

The steering tag allows the PCIe controller 102 to route data between various memory locations within the PCIe architecture 100. For example, if the steering tag ST[7:0] equals 0xFF, then the PCIe controller 102 routes the TLP processing hint packet 400 to local memory 108 using its standard address translations. Otherwise, the PCIe controller 102 routes the TLP processing hint packet 400 to the memory 121 of the host system 120 after the PCIe controller 102 modifies the packet to clear the TH bit 401. The PCIe controller 102 also replaces the ST[7:0] field with 0xFF for a memory read request, which indicates all byte enables are set. For memory write packets, the ST[7:0] field is allowed to have any value, so it need not be modified. The PCIe controller 102 then replaces the least significant 8 bits of the Requester ID field 402 with ST[7:0] to indicate the virtual function number associated with the I/O request.

The PCIe driver 101 of the host system 120 also supplies the 8-bit value to be used for the steering tag ST[7:0] as part of the I/O descriptor that the PCIe driver 101 sends to the PCIe controller 102 for processing. The PCIe driver 101 sets the steering tag ST[7:0] value to 0xFF if the data is to be written to or read from the memory 108 of the PCIe controller 102. Otherwise, the PCIe driver 101 sets the value of the steering tag ST[7:0] to a virtual function number associated with the I/O to be performed. Thus, the PCIe driver 101 is also operable to transfer virtual functions of a virtualized controller (e.g., such as that found in an SR-I/OV PCIe controller) between the memory 121 of the host system 120 and a selected device (e.g., one of the SSDs 115/disk drives 116), even if the selected device does not support virtualization. The virtual function number is simply set to logical "0" if virtual I/O is not supported or being used by the desired device.

When the PCIe controller 102 creates a command for a device, the controller 102 fills in the PCIe steering tag ST[7:0] of the device's command with the 8-bit value it received from the PCIe driver 101 of the host system 120. The device, having been enabled to use steering tags by the PCIe controller 102, simply sets the TH bit 401/501 in every request the device makes to move data for the I/O command. The device also inserts the supplied steering tag ST[7:0] of the TLP processing hint packets 400 and 500. If the device is not enabled to support or cannot support TLP processing hints, then the TH bits 401/501 are simply not set.

Figure 6:
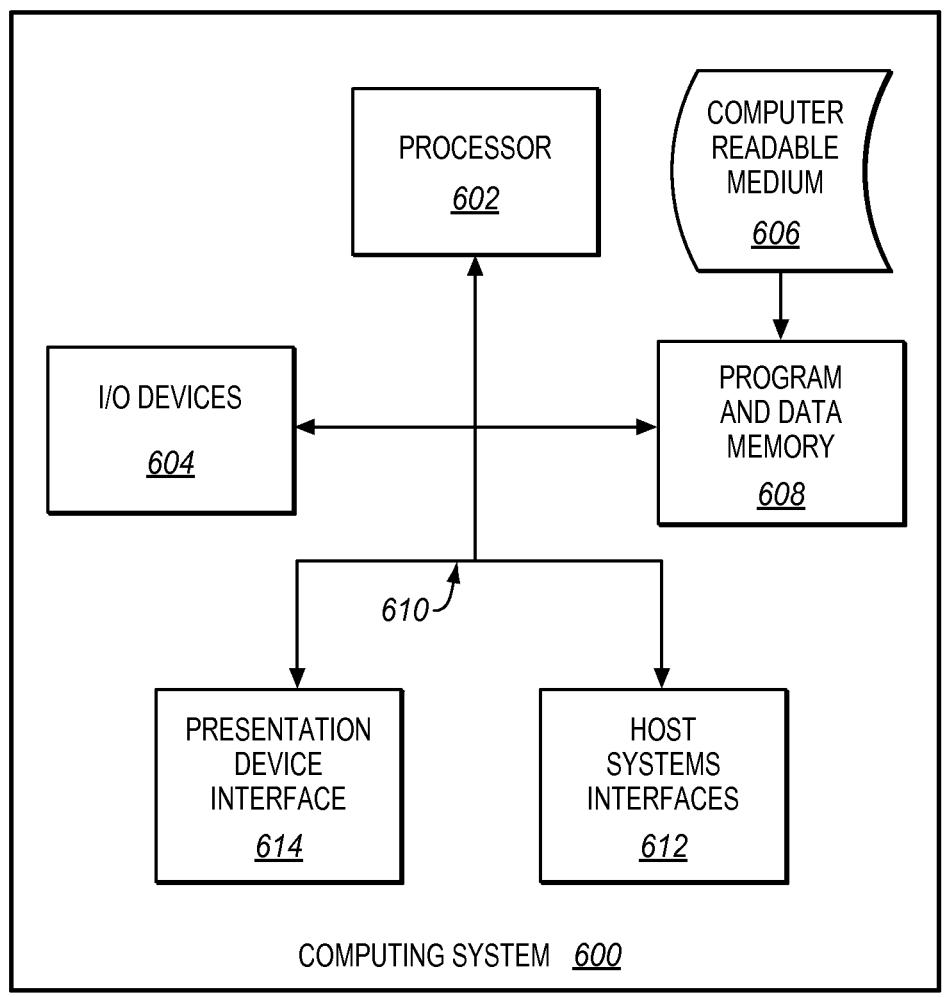
FIG. 6 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 600 in which a computer readable medium 606 may provide instructions for performing any of the methods disclosed herein.

Furthermore, the invention can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computing system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 612, or remote printers or storage devices through intervening private or public networks. Modems, cable modem and Ethernet cards are just a few of the currently available types of network adapters.

Since data can be directly transferred between memory locations in the matter discussed herein, system performance is dramatically improved because there is no longer a need to store transferred data in memory of the PCIe controller or other PCIe device. And, support for I/O virtualization by a device not supporting I/O virtualization is now possible because the steering tags can be associated with the virtualized hardware functionality of the PCIe controller or other PCIe device. Although the TLP processing hints of the PCIe protocol herein have been shown and described with respect to its use with a PCIe controller, the invention is not intended to be so limited. Rather, the inventive aspects of the TLP processing hints herein may be implemented with any device or system implementing the PCIe protocol and using a nontransparent PCIe bridge.

What is claimed is:

1. A system, comprising:
a Peripheral Component Interconnect Express controller coupled to a device through a nontransparent bridge and operable to direct input/output operations to the device on behalf of a host system, wherein the device comprises a solid state drive or a hard disk drive; and
a Peripheral Component Interconnect Express driver operable within the host system to generate an input/output descriptor to directly transfer data between a memory address of the device and a memory address of the host system, wherein the input/output descriptor includes routing information for the device,
wherein the controller is further operable to process the input/output descriptor from the driver, to generate a input/output command for the memory address of the device that includes the routing information for the device, to process a Transaction Layer Packet processing hint from the device that includes a steering tag to route the data, and to route the data between the memory address of the host system and the memory address of the device through the nontransparent bridge based on the routing information and the steering tag of the processing hint while bypassing a memory of the controller.

2. The system of claim 1, wherein:
the processing hint includes a flag; and
the steering tag is set to a value including or between 0×00 and 0×FE when the flag is set to route the data between the memory address of the host system and the memory address of the device bypassing the memory of the controller.

3. The system of claim 1, wherein:
the controller is a Single Root Input/Output Virtualization controller operable to virtualize hardware functionality of the controller;
the driver is further operable to generate another input/output descriptor to directly transfer a virtual function identifier of the controller between another memory address of the device and another memory address of the host system;
the input/output descriptor includes other routing information for the device; and
the controller is further operable to process the other routing information, to generate a command for the virtual function identifier of the other memory address of the device that includes the other routing information for the device, and to route the virtual function identifier between the memory address of the host system and the memory address of the device through the nontransparent bridge based on the other routing information bypassing the memory of the controller.

4. The system of claim 3, wherein:
the controller is further operable to process a Transaction Layer Packet processing hint from the device, wherein the processing hint includes a steering tag to route the virtual function identifier based on the other routing information;
the processing hint includes a flag; and
the steering tag is set to a value including or between 0×00 and 0×FE when the flag is set to route the virtual function identifier between the memory address of the host system and the memory address of the device.

5. A method operable in a Peripheral Component Interconnect Express architecture, the method comprising:
establishing a connection to a device through a nontransparent bridge of a Peripheral Component Interconnect Express controller, wherein the device comprises a solid state drive or a hard disk drive;
generating an input/output descriptor with a Peripheral Component Interconnect Express driver in a host system to directly transfer data between a memory address of the device and a memory address of the host system through the nontransparent bridge, wherein the descriptor includes routing information for the device;
processing the descriptor at the controller to retrieve the routing information;
generating a input/output command for the data at the controller that transfers the data between the memory address of the device and the memory address of the host system through the nontransparent bridge based on the routing information;
processing a Transaction Layer Packet processing hint from the device that includes a steering tag to route the data and
routing the data between the memory address of the device and the memory address of the host system through the nontransparent bridge based on the routing information and the steering tag while bypassing a memory of the controller.

6. The method of claim 5, further comprising:
processing a Transaction Layer Packet processing hint from the device at the controller based on the routing information to route the data, wherein the processing hint includes a steering tag;
setting a flag in the processing hint; and
setting the steering tag to a value including or between 0×00 and 0×FE to route the data between the memory address of the host system and the memory address of the device through the nontransparent bridge bypassing the memory of the controller.

7. The method of claim 5, further comprising:
generating another input/output descriptor with the driver to directly transfer a virtual function identifier of the controller between another memory address of the device and another memory address of the host system, wherein the input/output descriptor includes other routing information for the device;

processing the other input/output descriptor at the controller to retrieve the other routing information;

generating a command for the virtual function identifier that transfers the virtual function identifier between the other memory address of the device and the other memory address of the host system through the nontransparent bridge based on the other routing information; and bypassing a memory of the controller to route the virtual function identifier between the other memory address of the device and the other memory address of the host system through the nontransparent bridge.

8. The method of claim 7, further comprising:

processing a Transaction Layer Packet processing hint from the device at the controller based on the other routing information to route the virtual function identifier, wherein the other processing hint includes a steering tag;

setting a flag in the processing hint; and setting the steering tag in the other processing hint to a value including or between 0×00 and 0×FE to route the virtual function identifier between the other memory address of the host system and the other memory address of the device through the nontransparent bridge bypassing the memory of the controller.

9. A non-transitory computer readable medium comprising instructions that, when executed by one or more processors in a Peripheral Component Interconnect Express architecture, direct the one or more processors to:

establish a connection to a device through a nontransparent bridge of a Peripheral Component Interconnect Express controller, wherein the device comprises a solid state drive or a hard disk drive;

generate an input/output descriptor with a Peripheral Component Interconnect Express driver in a host system to directly transfer data between a memory address of the device and a memory address of the host system through the nontransparent bridge, wherein the descriptor includes routing information for the device;

process the descriptor at the controller to retrieve the routing information;

generate a input/output command for the data at the controller that transfers the data between the memory address of the device and the memory address of the host system through the nontransparent bridge based on the routing information;

process a Transaction Layer Packet processing hint from the device that includes a steering tag to route the data; and route the data between the memory address of the device and the memory address of the host system through the nontransparent bridge based on the routing information and the steering tag while bypassing a memory of the controller.

10. The computer readable medium of claim 9, wherein the instructions direct the one or more processors to:

process a Transaction Layer Packet processing hint from the device at the controller based on the routing information to route the data, wherein the processing hint includes a steering tag;

set a flag in the processing hint; and set the steering tag to a value including or between 0×00 and 0×FE to route the data between the memory address of the host system and the memory address of the device through the nontransparent bridge bypassing the memory of the controller.

11. The computer readable medium of claim 9, wherein the instructions direct the one or more processors to:

generate another input/output descriptor with the driver to directly transfer a virtual function identifier of the controller between another memory address of the device and another memory address of the host system, wherein the input/output descriptor includes other routing information for the device;

process the other input/output descriptor at the controller to retrieve the other routing information;

generate a command for the virtual function identifier that transfers the virtual function identifier between the other memory address of the device and the other memory address of the host system through the nontransparent bridge based on the other routing information; and bypass a memory of the controller to route the virtual function identifier between the other memory address of the device and the other memory address of the host system through the nontransparent bridge.

12. The computer readable medium of claim 11, wherein the instructions direct the one or more processors to:

process a Transaction Layer Packet processing hint from the device at the controller based on the other routing information to route the virtual function identifier, wherein the other processing hint includes a steering tag;

set a flag in the processing hint; and set the steering tag in the other processing hint to a value including or between 0×00 and 0×FE to route the virtual function identifier between the other memory address of the host system and the other memory address of the device through the nontransparent bridge bypassing the memory of the controller.

* * * * *